United States Patent [19]
Rambauske

[11] 3,790,258
[45] Feb. 5, 1974

[54] STEERABLE CATOPTRIC LENS ARRANGEMENT

[75] Inventor: Werner R. Rambauske, Carlisle, Mass.

[73] Assignee: Raytheon Company, Lexington, Mass.

[22] Filed: Apr. 20, 1972

[21] Appl. No.: 246,045

[52] U.S. Cl............ 350/294, 350/21, 350/25, 350/27, 350/199
[51] Int. Cl. ............................................. G02b 5/10
[58] Field of Search. 350/27, 25, 199, 21, 293, 294, 350/174, 170

[56] References Cited
UNITED STATES PATENTS

| | | | |
|---|---|---|---|
| 3,224,330 | 12/1965 | Kompfner | 350/294 |
| 3,453,425 | 7/1969 | Whitaker | 350/294 |
| 3,455,623 | 7/1969 | Harris | 350/27 |
| 2,306,679 | 12/1942 | Watmisham | 350/294 |
| 3,107,296 | 10/1963 | Hine | 350/174 |

Primary Examiner—David Schonberg
Assistant Examiner—Michael J. Tokar
Attorney, Agent, or Firm—Philip J. McFarland; Joseph D. Pannone

[57] ABSTRACT

Catoptric lens arrangements for changing the direction of a beam of wave-propagated energy are shown. In one class of embodiments, the beam is directed through an entrance lens assembly toward a first focal point. A steering lens assembly, the first mirror therein having a focal point coincident with the first focal point, is arranged to be moved relative to the entrance lens assembly to affect the desired steering. In another class of embodiments, the entrance beam lens assembly is adapted to produce a collimated beam at a fixed angular deviation from the entrance beam and the steering lens assembly is adapted to be moved relative to such collimated beam to effect the desired steering.

6 Claims, 6 Drawing Figures

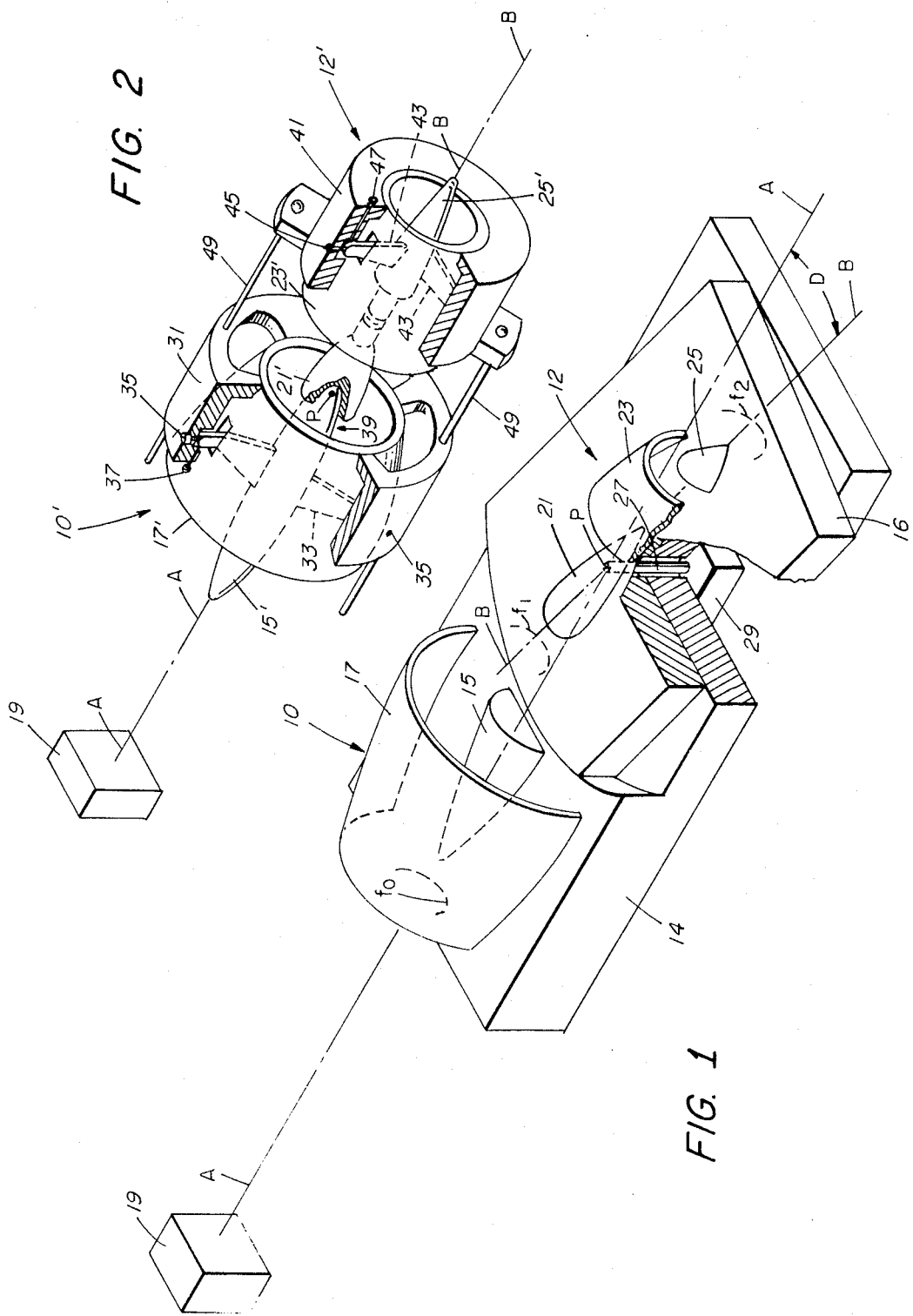

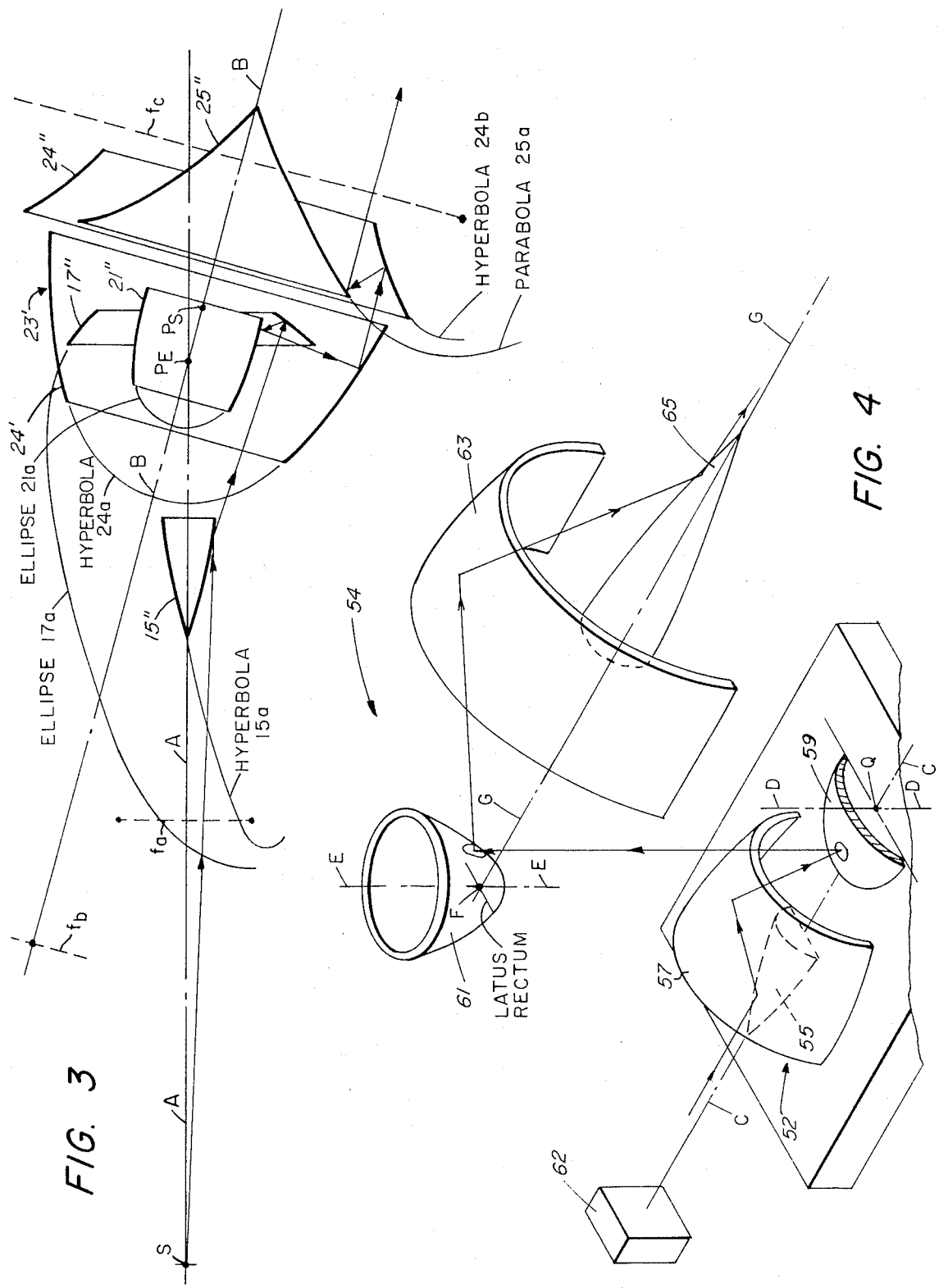

STEERABLE CATOPTRIC LENS ARRANGEMENT

BACKGROUND OF THE INVENTION

This invention pertains generally to catoptric lens arrangements and particularly to arrangements of such type that are adapted to change the direction of a focused or collimated beam of energy.

My copending U.S. application entitled "Catoptric Lens Arrangement," Ser. No. 203,684, filed Dec. 1, 1971 and assigned to the same assignee as this application, teaches that reflective lens elements may be arranged in an improved manner to focus or collimate "wave-propagated" energy along a lens axis without aberrations. That is, a diffraction-limited catoptric lens arrangement may be attained by shaping the reflecting surfaces of a number of lens elements to correspond to the surfaces generated by moving sections of quadratic conic sections (other than a section of the circular conic section) about a lens axis so that the logic of focal points of selected pairs of such sections are spaced from the lens axis and are coincident. By properly selecting the quadratic conic sections, i.e., using ellipsoidal, hyperbolic and parabolic sections in proper combination, such a lens arrangement may be constructed to focus, or collimate, wave-propagated energy, as electromagnetic or acoustic energy. The centerline of the emergent beam is, however, in all cases coincident with the lens axis.

If it is desired that the emergent beam be aimed in a particular direction, it is necessary with the arrangement just mentioned (as it is with any known lens system) either (a) to move the source and the lens arrangement; or, (b) to provide a movable planar mirror, as in a coelostat. It is evident that, in many cases, it is infeasible to move both a source and a lens arrangement. That is, when the source and the lens arrangement are large (or the source is relatively far away from the lens arrangement), the mechanical complexity and size of the required scanning mechanism makes it extremely difficult to direct a beam with a high degree of precision. On the other hand, if movable planar mirrors are used, with the lens arrangement fixed in position relative to the source (as in a coelostat), it is necessary that the "beam steering" mirrors be relatively large. To avoid unwanted aberrations, such mirrors must be "flat" at the wavelength of the energy being scanned. Obviously, such combined requirements make it extremely difficult to provide accurate scanning means.

SUMMARY OF THE INVENTION

Therefore, it is a primary object of this invention to provide improved beam steering mechanisms for catoptric lens arrangements.

Another object of this invention is to provide improved scanning apparatus in which a relatively small beam steering mirror arrangement is used.

These and other objects of this invention are attained generally in one embodiment by providing, in a catoptric lens arrangement, a pair of fixed lens elements disposed along an entrance axis for directing the rays in an entrance beam toward an internal focal point and a triplet of steering lens elements disposed along an exit axis and pivotably mounted at the internal focal point, such triplet of steering lens elements being arranged to form a desired emergent beam by refocusing (or collimating) the rays in the entrance beam directed toward the internal focal point. The various lens elements have reflecting surfaces corresponding to the shapes obtained by rotating (or nutating) selected sections of parabolas, hyperbolas or ellipses about a rotational axis which is not coincident with an axis of symmetry of the selected generatrices. As a result, the triplet of steering lens elements change the direction of the emergent beam with respect to the entrance beam in accorcance with movement of the steering beam triplet about its pivot.

In a second embodiment, the objects of this invention are attained by providing fixed reflective lens elements to collimate and direct an entrance beam (in a predetermined direction, preferably orthogonally to its entrance axis) and then, by providing a triplet of lens elements which may be moved independently of the fixed reflective lens elements, to deflect the beam in any direction within a hemisphere. In still another embodiment, a beam folding mirror is provided between lens elements in the beam steering triplet to reduce the physical size of such triplet.

BRIEF DESCRIPTION OF THE DRAWINGS

For a more complete understanding of this invention, reference is now made to the following description of embodiments of this invention as illustrated in the accompanying drawings, in which:

FIG. 1 is a view of an asymmetrical catoptric lens arrangement according to this invention, the illustrated arrangement being somewhat simplified to show most clearly the relationship between the various lens elements;

FIG. 2 is a view of a symmetrical catoptric lens arrangement according to this invention, the illustrated arrangement being adapted to deflect an entrance beam in any direction within a relatively narrow solid angle;

FIG. 3 is a sketch showing an alternative way in which the various elements in a steerable catoptric lens arrangement may be disposed;

FIG. 4 is a view of a catoptric lens arrangement adapted to deflect an entrance beam in any direction within a hemisphere;

DESCRIPTION OF THE PREFERRED EMBODIMENTS

Figure 5:
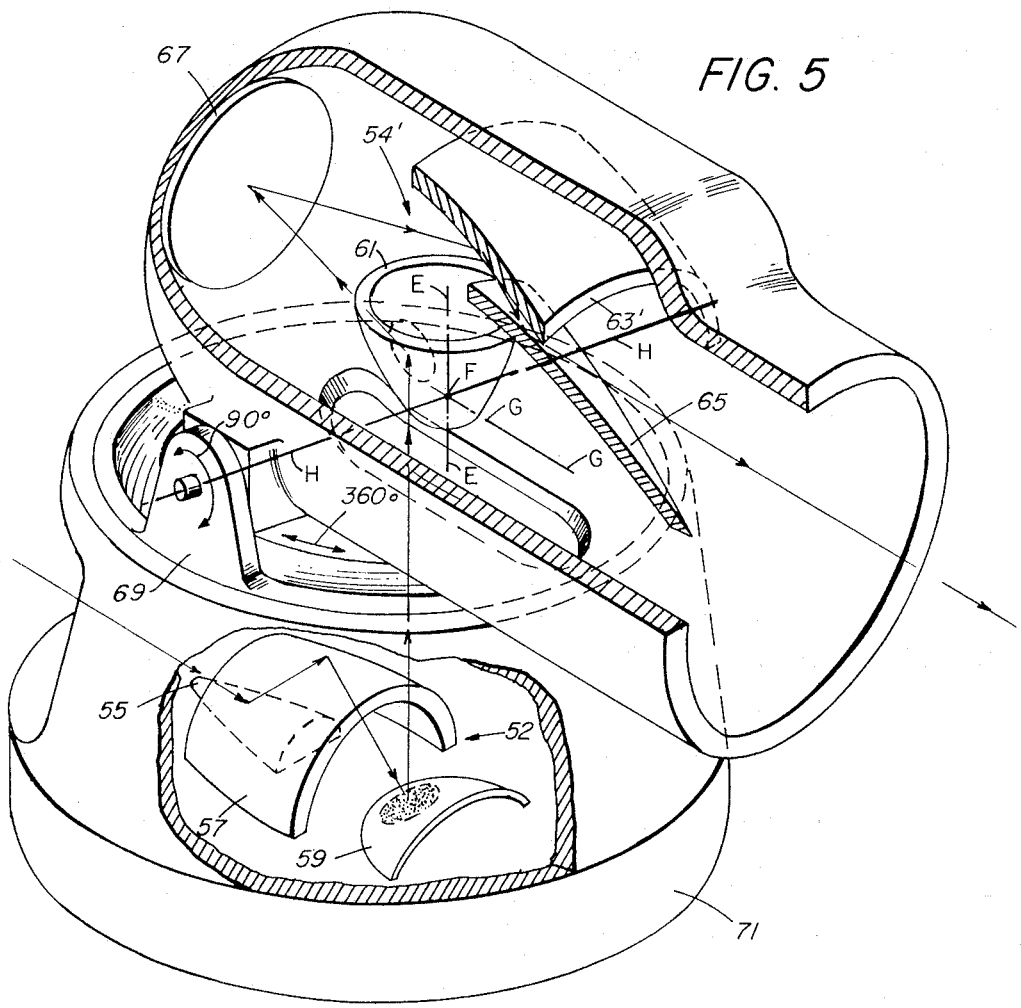
FIG. 5 is an alternative embodiment of the catoptric lens arrangement shown in FIG. 4.

Referring now to FIG. 1, it may be seen that an asymmetrical catoptric lens arrangement embodying this invention may include an entrance lens doublet 10 and steering lens triplet 12, the former being mounted on a fixed base 14 and the latter being mounted on a movable base 16. The entrance lens doublet 10 is made up of an entrance mirror 15 and a secondary mirror 17. The reflecting surface (not numbered) of the entrance mirror 15 here corresponds to one-half of the surface formed by rotating a section of a first parabola (not shown) about an axis parallel to, but displaced from, the axis of symmetry of the first parabola. It may be seen, therefore, that the locus of the focal point of the first parabola is a semicircle as represented by "$f_o$."

The reflecting surface of the secondary mirror 17 here corresponds to one-half of the surface formed by nutating a section of a first ellipse (not shown) about its major axis, with one focal point, "P," of such ellipse remaining stationary and the second focal point describing a circle having the same radius as the semicircle "$f_o$." It follows, then, that the entrance mirror 15 and the secondary mirror 17 may be affixed in any convenient manner to the fixed base 14 along line A-A so that their focal circles coincide at semicircle "$f_o$."

It will be noted here that the just-described arrangement of the entrance lens doublet 10 is operative to focus wave-propagated energy at the focal point "P." Thus, if a source 19, as a laser, is disposed along line A-A to project a substantially collimated beam of light on the reflecting surface of the entrance mirror 15, the substantially parallel rays in such beam will become divergent. Each divergent ray, however, will appear to have originated at a point on the semicircle, $f_o$, i.e., at one focal "point" of the first ellipse. Therefore, after reflection from the reflecting surface of the secondary mirror 17, a divergent rays will be changed to convergent rays directed toward the second focal point of the first ellipse, i.e., toward the focal point "P."

Before the convergent rays from the secondary mirror 17 arrive at the focal point "P" they fall on the convex reflecting surface (not numbered) of a first beam steering mirror 21 in the steering lens triplet 12. The reflecting surface of such mirror corresponds to the surface generated by nutating a section of a second ellipse (not shown) about its major axis (line B—B) so that one of its focal points corresponds with the focal point "P" of the first ellipse and the second of its focal points describes a semicircle, $f_1$. The concave reflecting surface of the second beam steering mirror 23 corresponds to the surface formed by nutating a section of a third ellipse (not shown) about its major axis (line B—B) so that: (a) one of its focal points coincides with semicircle, $f_1$; and (b) its second focal point describes a semicircle, $f_2$. The reflecting surface of the third beam steering mirror 25 corresponds to the surface formed by rotating a second parabola (not shown) about line B—B, where that line is parallel to the axis of symmetry of the second parabola, but displaced therefrom. The amount of displacement is such that the semicircle traced out by the focal point of the second parabola has the same radius as the semicircle, $f_2$. The just-described lens elements in the steering lens triplet 12 are affixed in any convenient way to the movable base 16 so that the various focal semicircles are coincident. The movable base 16, in turn, is pivotably mounted on the fixed base 14 by means of a shaft 27 passing through the fixed base 14 at the point "P." The shaft 27, in turn, is connected to a rotating mechanism, as a motor 29.

It will be observed that, so long as the converging rays from the secondary mirror 17 fall on the convex reflecting surface of the first beam steering mirror 21, all rays reflected from the latter will appear to have originated from points along the semicircle, $f_1$. In other words, such reflected rays will appear to have originated at points on one focal semicircle of the second beam steering mirror 23. Such rays, after reflection by the latter, are directed toward points on semicircle $f_2$, but are reflected again by the reflecting surface of the third steering mirror 25 in an emergent beam parallel to line B—B. The angle "D" between the line A-A and the line B—B may be varied within limits by actuating the motor 29 so that the direction of the emergent beam may be changed.

Referring now to FIG. 2, it may be seen that the principles of this invention may be applied to a symmetrical catoptric lens arrangement to allow a beam of wave-propagated energy to be directed through a solid angle. Thus, an entrance lens doublet 10' and a steering lens triplet 12' are supported in a unitary structure to be described, such structure permitting relative angular movement between the two lens arrangements. The reflecting surfaces of each one of the lens elements is similar to the reflecting surfaces of a corresponding lens element in the embodiment shown in FIG. 1, except that each one of such surfaces here is a complete surface of revolution of a quadratic conic section. That is, entrance mirror 15' and the third steering mirror 25' have paraboloidal reflecting surfaces and the secondary mirror 17', the first steering mirror 21' and the second steering mirror 23' have ellipsoidal reflecting surfaces.

The relative positions of the entrance mirror 15' and the secondary mirror 17' along line A—A is here effected in a manner now to be described. Thus, a doublet mounting ring 31, within which the secondary mirror 17' is mounted in any convenient manner, is slotted to accommodate a number, say three, radial spiders 33. Each one of the latter is affixed in any convenient manner to the entrance mirror 15'. Adjusting screws 35 in the doublet mounting ring 31 then may be moved as required to make the longitudinal axes of the entrance mirror 15' and the secondary mirror 17' coincident. Adjusting screws 37, also in the doublet mounting ring 31 as shown, may then be moved to make the focal circles, $f_o'$, (not shown) coincident. It follows, then, that substantially axial rays in a beam from a source 19 and incident on the entrance mirror 15' will be directed to point "P." The rear end (not numbered) of the entrance mirror 15' is rounded to form the ball portion of a universal joint 39. Such portion is centered at the point "P."

The elements of the steering lens triplet 12 are mounted together in a manner similar to the manner in which the elements of the entrance lens doublet 10' are mounted. Thus, a triplet mounting ring 41, spiders 43 and adjusting screws 45, 47 are provided to align the three lens elements in the triplet along a line B—B. In this connection, it is highly desirable that the first steering mirror 21' and the third steering mirror 25' (which are coaxial) be mounted so that the spacing of the two along line B—B is adjustable as shown.

The entrance lens doublet 10' and the steering lens triplet 12' are held in position relative to one another by a number, say four, equally spaced steering rods 49 and a socket portion of the universal joint 39. Each one of the steering rods 49 is preferably connected to the triplet mounting ring 41 by a ball and socket joint (not shown). Each one of the steering rods is slidably mounted in an opening through the doublet mounting ring 31. It is evident, therefore, that by changing, in any convenient manner, not shown, the length of opposite pairs of steering rods 49 between the doublet mounting ring 31 and the triplet mounting ring 41, the orientation of the two rings with respect to each other may be changed in any direction. It follows, then, that the orientation of the line B—B with respect to line A—A may be changed correspondingly.

Referring now to FIG. 3, it may be seen that the overall length of a steerable catoptric lens arrangement of the type shown in FIGS. 1 and 2 may be reduced by appropriately positioning the first steering mirror. Thus, in FIG. 3, an entrance mirror 15″ and an associated secondary mirror 17″ are arranged to focus incident energy at a focal point, $P_e$, on axis A—A. The shape of the reflecting surfaces of the two mirrors, as before, depends on the characteristics of the incident energy. That is, if the incident beam is divergent (as from a laser, not shown) the reflecting surface of the entrance mirror 15″ corresponds to the surface generated by rotating a section of one branch of a hyperbola 15a about the axis A—A. Such rotation is the equivalent of nutating the hyperbola 15a around the axis A—A to cause one focal point of the hyperbola 15a to trace a focal circle, $f_a$. If the incident beam is collimated, the reflecting surface of the entrance mirror corresponds to the surface generated by rotating a section of a parabola (not shown) about the axis A—A so that the focal point of the parabola describes the focal circle, $f_a$. In either case, the reflecting surface of the secondary mirror 17″ corresponds to the shape generated by nutating a section of an ellipse 17a about the axis A—A, one focal point of such ellipse being held at the point $P_e$ on such axis and the other focal point being coincident with the focal circle, $f_a$.

The reflecting surface of the first steering mirror 21″ here is a true ellipsoid, corresponding to the surface generated by rotating a section of an ellipse 21a about an axis B—B. One focal point of ellipse 21 is coincident with focal point, $P_e$, and the other focal point, $P_s$, lies on the axis B—B. It will be observed now that the focal point, $P_s$, is the virtual origin of the beam being focused toward the focal point $P_e$. That is, regardless of the orientation of the first steering mirror 21″, the reflected beam from its reflecting surface will appear to have originated at focal point $P_s$.

The second steering mirror in this embodiment is made up of a concave hyperboloidal mirror 24′ and a convex hyperboloidal mirror 24″. The reflecting surface of the former corresponds to the surface generated by nutating a section of one branch of a hyperbola 24a about the axis B—B. One focal point of the hyperbola 24a is held coincident with the focal point, $P_s$. The other focal point then is moved to describe a focal circle, $f_b$. The reflecting surface of the convex hyperboidal mirror 24″ corresponds to the surface generated by nutating a section of one branch of a hyperbola 24b about the axis B—B. One focal point of the hyperbola 24b is moved to describe a focal circle coincident with focal circle, $f_b$. The second focal point of the hyperbola 24b is moved to describe a focal circle, $f_c$. It will now be apparent that the focal circle, $f_c$, is the virtual origin of the divergent beam reflected toward the axis B—B from the convex hyperboloidal mirror 24″.

The third steering mirror 25″ has a reflecting surface corresponding to the surface generated by rotating a section of a parabola 25a about the axis B—B, with the axis of symmetry of such parabola held parallel to the axis B—B. The focal point of the parabola 25a is moved to describe a circle coincident with the focal circle, $f_c$. It follows, therefore, that the emergent beam is collimated along the axis B—B.

The various mirrors in the embodiment illustrated in FIG. 3 may be pivotably mounted in any convenient manner (as, for example, shown in FIG. 1 or FIG. 2) around the focal point, $P_e$. It follows then that, so long as the converging beam from the secondary mirror 17″ falls on the reflecting surface of the first beam steering mirror 21″, the steering mirrors 21″, 23″ and 25″ may be moved as a unit to effect the desired steering.

Referring now to FIG. 4, it may be seen that it is not essential to the invention that an entrance lens arrangement 52 (referred to hereinbefore as the entrance lens doublet) and the movable portions of a beam steering lens arrangement 54 (referred to hereinbefore as the steering lens triplet) be in physical contact with each other. As a matter of fact, when the operation of an embodiment of the invention based on FIG. 4 is understood, it will be evident that the two lens arrangements may be mechanically separated.

In FIG. 4, the entrance lens arrangement 52 is a doublet made up of an entrance mirror 55 and a secondary mirror 57. The convex reflecting surface of the entrance mirror 55 corresponds to the surface generated by rotating a section of one branch of a hyperbola (not shown) through 180° about an axis C—C. Such rotation here is equivalent to nutating the principal axis of the hyperbola about the axis C—C with one focal point on such axis and the focal point of the other branch of the hyperbola describing a semicircle centered on the axis C—C. The concave reflecting surface of the secondary mirror 57 corresponds to the surface generated by nutating a section of an ellipse (not shown) through 180° about an axis C—C, one focal point of the ellipse being held on the axis C—C at point "Q" and the second focal point of the ellipse describing a semicircle coincident with the semicircle described by the rotation of the section of one branch of the hyperbola.

It is a well known fact that the tangent to any point on one branch of a hyperbola bisects the angle formed by the lines from the point to the focal points of the two branches of the hyperbola. It follows, then, that; if: (a) a source 62, as a laser, is placed at the focal point of the second branch of the hyperbola from which the reflecting surface of the entrance mirror 55 was generated; and, (b) the beam from such source is pointed to fall on such reflecting surface; the rays reflected by the entrance mirror 55 will all appear to have originated at points along the semicircle described by the focal point of the one branch. In other words, after reflection from the entrance mirror 55, all rays appear to have originated at a point on one "focal semicircle" of the secondary mirror 57. It is a well known property of an ellipse that the normal at any point bisects the angle formed by the lines from the point to the focal points of the ellipse. It follows, then, that all rays reflected by the secondary mirror 57 are here directed to converge at the point "Q." Before arriving at the point "Q," the convergent rays are again reflected from the convex reflecting surface of a collimating mirror 59 which may be considered to be a portion of the beam steering lens assembly 54. The convex reflecting surface of the collimating mirror 59 corresponds to the surface generated by rotating a section of a parabola through 180° about an axis D—D orthogonal to the axis C—C. The focal point of the parabola is held at point "Q." It is a property of a convex reflecting parabola that rays incident thereon and directed toward the focal point thereof are reflected in a direction parallel to the principal axis of the parabola. Thus, with the reflecting surface of collimating mirror 59 a paraboloid, all rays incident thereon are deflected parallel to the axis D—D. That is, the beam collimated and its axis is then orthogonal to the axis C—C.

Before proceeding further, it will be noted that the exact shapes and dimensions of the lens elements in the entrance lens arrangement may be varied within wide limits so long as the various lens elements are kept confocal as described. Thus, the shape of the reflecting surface of the entrance mirror 55 may be changed to accommodate beams from different sources, meaning beams whose divergence angle and power density differs from those of a laser; and the shape of the reflecting surface of the secondary mirror 57 may be changed to change the length of the entrance lens arrangement 52. Further, the shape of the collimating mirror 59 may be changed to change the cross-section of the collimated beam.

The movable portion of the steering lens arrangement 54 is here a triplet, made up of a first steering mirror 61, a second steering mirror 63 and a third steering mirror 65. The reflecting surfaces of the three mirrors here are, respectively, paraboloidic, parellipsoidal and hyperboloidal in shape. The order of the different reflecting surfaces in the movable portion of the steering lens arrangement 54 is here opposite to the order of the different reflecting surfaces in the entrance lens arrangement 52. Therefore, as would be expected, the steering lens arrangement 54 will produce, from a collimated beam in, a focused emergent beam.

The first steering mirror 61 has a reflecting surface corresponding to the surface generated by rotating a section of a parabola about an axis E—E parallel to, but displaced from, both the axis D—D and the collimated beam from the collimating mirror 59. The second steering mirror 63 has a reflecting surface corresponding to the surface generated by nutating a section of an ellipse about an axis G—G, such axis passing through the focal point, F, of the parabola from which the reflecting surface of the first steering mirror 61 was generated. One focal point of the ellipse is coincident with point "F." The second focal point of the ellipse, then, traces a focal circle about axis G—G. The third steering mirror 65 has a reflecting surface corresponding to the surface generated by nutating a section of one branch of a hyperbola about the axis G—G so that the focal point of that branch traces a circle coincident with the focal circle of the ellipse and the focal point of the second arm of the hyperbola remains on axis G—G. It follows, then, that the emergent beam out of the steering lens arrangement 54 will be focused at the focal point of the second arm of the hyperbola. As was the case with the lens elements in the entrance lens arrangement 52, the size and shape of the lens elements in the steering lens arrangement 54 may be varied within wide limits. In this connection, it should be noted that, ordinarily, the root of the illuminated portion of the third steering mirror 65 should be made as large as practicable for any particular application so that diffraction effects are minimized.

It will be noted that there are several degrees of freedom of movement (between the movable portion of the steering lens arrangement 54 and the entrance lens arrangement 52) which do not disturb the focusing properties of the entire lens arrangement. First, if the movable portion of the steering lens arrangement 54 is rotated about the principal axis E—E of the parabola to which the reflecting surface of the first steering mirror 61 corresponds, the emergent beam will be similarly rotated. Obviously, there is no limitation on the amount of such rotation because the reflecting surface of the first steering mirror 61 is the same regardless of the orientation of such mirror. In other words, the emergent beam may be continuously rotated in azimuth. Second, if the movable portion of the steering lens arrangement 54 is rotated about a latus rectum of the parabola to which the reflecting surface of the first steering mirror 61 corresponds, then the emergent beam is similarly rotated. In other words, the emergent beam may be rotated in elevation. It is evident, however, that there are limitations on the degree of rotation possible in the last-mentioned manner. It will be evident that, because the shape of the illuminated portion of the reflecting surface of the first steering mirror 61 changes, the shape of the beam within the movable portion of the steering lens arrangement 54 also changes. Thus, it is possible to encounter conditions in which the lens elements either do not intercept all of the beam or obscure portions of it. In the extreme, it is possible that the first steering mirror 61 not intercept all of the collimated beam from the collimating mirror 59 because: (1) a portion of the reflecting surface of the first steering mirror 61 becomes parallel to such collimated beam; or (2) the third steering mirror 65 obscures a portion of such collimated beam. It has been found, however, that sufficient rotation of the moving portion of the beam steering lens assembly 54 is possible so that the emergent beam may be rotated through more than 90° in elevation. Further, the movable portion of the steering lens arrangement 54 may be translated along the axis G—G. Such movement again changes the illuminated area of the first steering mirror 61 to change the paths of rays within the movable portion of the steering lens arrangement 54. Such changes do not, however, change the direction of the emergent beam, but do change its focal point. Finally, the movable portion of the steering lens arrangement 54 may be moved toward, or away from, the entrance lens arrangement 52. Such movement has no effect other than to translate the axis of the emergent beam by a distance equal to the distance through which the movable portion of the steering lens arrangement 54 is moved. While such translation of the emergent beam ordinarily is of little importance, freedom to change the distance between the entrance lens arrangement 52 and the movable portion of the steering lens arrangement 54 is, obviously, very important in the mechanical design of practical systems, making it simpler to adapt to differing physical locations.

Referring now to FIG. 5, it may be seen that the embodiment of FIG. 4 may be modified, if desired, to include a folded optical path in the movable portion of the steering lens arrangement 54 (FIG. 4). Thus, in FIG. 5, an entrance lens arrangement 52 (which may be the same as that described in connection with FIG. 4) is arranged to produce, in cooperation with a collimating mirror 59, a collimated beam impinging on the reflecting surface of a first steering mirror 61 in the movable portion of a steering lens arrangement 54'. The first steering mirror 61 in FIG. 5, may be the same as the first steering arrangement 61 in FIG. 4, i.e., have a reflecting surface in the shape of a paraboloid with its focal point at "F." A planar mirror 67 is disposed in the path of the reflected rays from the first steering mirror 61 to redirect such rays toward the reflecting surface of a second steering mirror 63'. The reflecting surface of the latter is similar to the reflecting surface of the second steering mirror 63 (FIG. 4) in that the two surfaces are parellipsoidal. The first focal point of the reflecting surface of the second steering mirror 63' is not, however, coincident with the point "F" but rather is coincident with the virtual origin of the rays reflected from the planar mirror on the latus rectum, i.e., axis G—G, of a meridional parabola through the first steering mirror 61. The concave reflecting surface of the second steering mirror 63' corresponds then to the surface formed by nutating a section of an ellipse about the axis G—G. The reflecting surface of the third steering mirror 65 (which here is the same as the reflecting surface of the third steering mirror 65 of FIG. 4) corresponds to the surface generated by nutating a section of one branch of a hyperbola about the axis G—G, the focal point of the second branch of the hyperbola being held on such axis.

The movable portion of the steering lens arrangement 54' is here mounted within a turret 69 which is rotatably mounted on a pedestal 71. The turret 69 is freely rotatable about an axis E—E which is coincident with the principal axis of the reflecting surface of the first steering mirror 61 and rotatable (through an angle of at least 90°) about an axis H—H which is coincident with a latus rectum of that reflecting surface. The planar mirror 67 may, if desired, be adjustably mounted in any conventional manner (not shown) to the turret 69. In passing, it is noted that the adjustment of the planar mirror 67 with respect to the first and second steering mirrors 61, 63' may be changed, within reasonable limits, to compensate for misalignment of the latter mirror. That is, if the focal point of the second steering mirror 63' is actually not on the axis G—G, the orientation of the planar mirror 67 may be changed to compensate for such error.

It will now be apparent that the embodiment of this invention shown in FIG. 5 is similar to the operation of the embodiment shown in FIG. 4. That is, the direction of the emergent beam may be changed to any direction within a hesmiphere by rotating the turret 69 around both its axes of rotation.

Figure 6:
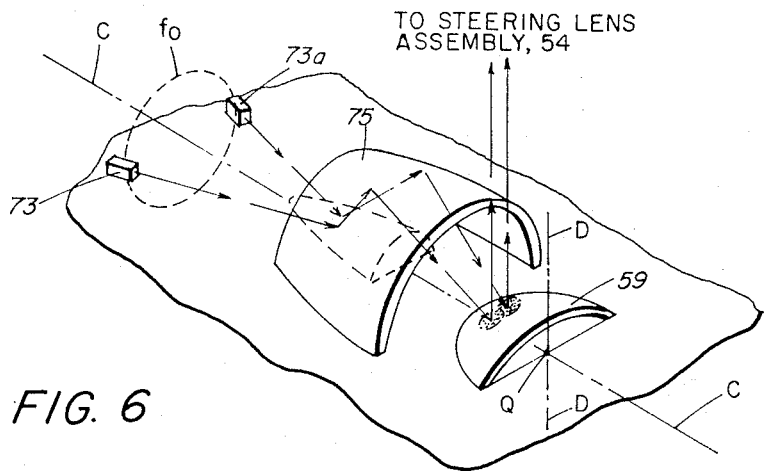
FIG. 6 is a sketch showing how any of the illustrated catopric lens arrangements may be modified to form a composite collimated beam from beams from more than one source.

Referring now to FIG. 6, it may be seen that the entrance lens assembly 52 of FIGS. 4 and 5 may be changed so that the source, or sources, of the wave-propagated energy to be steered may be positioned off the axis of the entrance lens assembly. Thus, a number (here two) of sources 73, 73a may be positioned on a focal circle, $f_o$. Such circle here, for convenience, is the focal circle of the parellipsoidal reflecting surface (not numbered) of a concave mirror 75. The reflecting surface of the former mirror is a cone about the axis C—C. The reflecting surface of the latter mirror corresponds to the surface generated by nutating a section of an ellipse describing the focal circle, $f_o$, and the other focal point being held on the axis C—C at point Q. A collimating mirror 59 (which here is the same as the collimating mirror 59 of FIGS. 4 and 5) is disposed between the point Q and the concave mirror 75. The principal axis D—D of the collimating mirror 59 is orthogonal to the axis C—C and the focal point of such mirror is coincident with the point Q.

It may be seen that diverging beams from the sources 73, 73a, upon reflection by the entrance mirror 55 and the concave mirror 75, converge toward the point Q. Before reaching that point, the now convergent beams are reflected in collimated beams in a direction parallel to the axis D—D. Such collimated beams, which are parallel to each other, then are passed to the steering lens assembly 54 (FIG. 4 or 5). It will be noted here that, in the elementary arrangement shown, different areas of the entrance mirror 55, the concave mirror 75 and the collimating mirror 59 are illuminated by the two sources 73, 73a. The amount of overlap is, of course, adjustable by changing the position of the sources 73, 73a (or by adding other sources on the focal circle, $f_o$. Obviously, therefore, the cross-sectional shape and the intensity distribution of the energy in the collimated beam may be changed correspondingly when desired.

Having described several embodiments of my invention, it will now be apparent to one of skill in the art that many changes may be made without departing from my inventive concepts. Thus, it is clear that the embodiments shown may be used, after appropriate scaling, for directing wave-propagated energy other than optical energy. Further, it is evident that the shape, or dimensions, of the various lens elements may be varied depending upon the parameters of the entrance beam and the emergent beam. It is felt, therefore, that this invention should not be restricted to its disclosed embodiments but rather should be limited only by the spirit and scope of the appended claims.

What is claimed is:

1. A catoptric lens arrangement for changing the direction of a beam of light from a laser, such arrangement comprising:

a. first mirror means disposed around a first axis of symmetry, such first axis being substantially colinear with the longitudinal axis of the beam of light from the laser, for directing the rays in such beam toward a first focal point on the first axis of symmetry;

b. second mirror means disposed around a second axis of symmetry for redirecting the rays converging toward the first focal point along the second axis of symmetry, such second mirror means including a convex paraboloidal mirror disposed between the first mirror means and the first focal point, such mirror having a second focal point coincident with the first focal point; and c. means for moving the second mirror means relative to the first mirror means and for maintaining coincidence between the first and second focal points to change the direction of the beam of light from the laser.

2. A catoptric lens arrangement as in claim 1 wherein the first mirror means includes a convex and a concave reflector, the concave reflector being illuminated by the beam of light from the laser and the concave reflector being illuminated by the light reflected from the convex reflector, each one of such reflectors having a pair of conjugate foci spaced along the axis of symmetry with one focus of the concave reflector, the conjugate focus of the convex reflector being coincident with the position of the laser and the conjugate focus of the concave reflector being coincident with the first focal point.

3. A catoptric lens arrangement as in claim 2 wherein the coincident foci of the convex and concave reflectors are spatially separated from the first axis of symmetry.

4. A catoptric lens arrangement for changing the direction of a beam of light from a laser, such arrangement comprising:
   a. first mirror means disposed around a first axis of symmetry, such first axis being substantially colinear with the longitudinal axis of the beam of light from the laser, for directing the rays in such beam toward a first focal point on the first axis of symmetry;
   b. a first convex paraboloidal mirror disposed about a second axis of symmetry, such second axis differing from the first axis of symmetry, for redirecting the rays convergent on the first focal point to form a collimated beam in a direction parallel to the second axis of symmetry, the focal point of such mirror being coincident with the first focal point;
   c. second mirror means, including a second convex paraboloidal mirror disposed in the path of the beam formed of rays reflected from the first convex paraboloidal mirror, such second convex paraboloidal mirror having a focal point spatially separated from the collimated beam, such second convex paraboloidal mirror being pivotably mounted about a rotational axis passing through such focal point and the longitudinal axis of the collimated beam; and
   d. means for pivoting the second convex paraboloidal mirror about the rotational axis.

5. A catoptric lens arrangement as in claim 4 having, additionally:
   a. third mirror means, disposed in the path of the rays reflected from the second convex paraboloidal mirror, for redirecting such rays to form an emergent beam; and
   b. mounting and rotating means for maintaining the second convex paraboloidal mirror and the third mirror means in a fixed position relative to one another and for rotating such elements about the longitudinal axis of the collimated beam.

6. A catoptric lens arrangement for combining and directing diverging beams for a plurality of lasers disposed at points on a circle, such arrangement comprising:
   a. first mirror means disposed around a first axis of symmetry orthogonal to the circle, such mirror means including:
      i. an entrance mirror having a convex reflecting surface illuminated by the diverging beams from the plurality of lasers, the generatrix of such surface being a portion of a hyperbola nutated around the first axis of symmetry, one focal point of such hyperbola being coincident with the circle and the conjugate focal point of such hyperbola being a point of the axis of symmetry, the plurality of beams thereby being converted to a composite diverging beam apparently originating at the conjugate focal point of such hyperbola;
      ii. a secondary mirror having a concave reflecting surface illuminated by the composite diverging beam from the entrance mirror, such concave reflecting surface being ellipsoidal and having one focal point coincident with the conjugate focal point of the hyperbola and having a second focal point on the first axis of symmetry to convert the composite diverging beam to a composite convergent beam directed toward the conjugate focal point of the secondary mirror;
   b. second mirror means disposed about a second axis of symmetry and in the path of the composite convergent beam, such second mirror means including a convex paraboloidal mirror having its focus coincident with the conjugate focal point of the secondary mirror; and
   c. means for moving the second mirror means relative to the first mirror means and for maintaining coincidence between the focus of the convex paraboloidal mirror and the conjugate focal point of the secondary mirror.

* * * * *